(12) United States Patent
Itoh et al.

(10) Patent No.: US 8,113,672 B2
(45) Date of Patent: Feb. 14, 2012

(54) OUTER MIRROR

(75) Inventors: Masahiko Itoh, Shizuoka (JP); Kenji Ichikawa, Shizuoka (JP); Hiroyuki Kajiyama, Fujieda (JP)

(73) Assignee: Murakami Corporation, Shizuoka (JP)

( * ) Notice: Subject to any disclaimer, the term of this patent is extended or adjusted under 35 U.S.C. 154(b) by 357 days.

(21) Appl. No.: 12/432,944

(22) Filed: Apr. 30, 2009

(65) Prior Publication Data

US 2009/0279195 A1 Nov. 12, 2009

(30) Foreign Application Priority Data

May 12, 2008 (JP) ................................. 2008-124465

(51) Int. Cl.
*G02B 7/182* (2006.01)
(52) U.S. Cl. ....................................................... 359/876
(58) Field of Classification Search .................. 359/841, 359/872, 874, 876, 879; 248/477, 478, 476, 248/483, 484
See application file for complete search history.

(56) References Cited

U.S. PATENT DOCUMENTS 4,789,232 A * 12/1988 Urbanek ....................... 359/872

FOREIGN PATENT DOCUMENTS

| JP | 11-180216 | 7/1999 |
| JP | 2000-318522 | 11/2000 |

OTHER PUBLICATIONS

English language Abstract of JP 2000-318522, Nov. 21, 2000.
English language Abstract of JP 11-180216, Jul. 6, 1999.

* cited by examiner

*Primary Examiner* — Euncha Cherry
(74) *Attorney, Agent, or Firm* — Greenblum & Bernstein P.L.C.

(57) ABSTRACT

An object of the present invention is to provide an outer mirror which prevents the whistle noise without the rotation of the mirror assembly being prevented. In order to achieve the above object, an outer mirror which includes a mirror base provided on a vehicle body; a shaft portion fixed to the mirror base; a mirror assembly rotatably mounted on the mirror base around the shaft portion used as a rotational axis; a windshield member to occlude a gap between the mirror base and the mirror assembly, in which the shaft portion includes a mounting seat attached to the mirror base; a shaft body provided uprightly on the mounting seat, the mirror assembly includes a housing having an opening toward the mirror base and the shaft body is inserted into the opening; and a mirror attached to the housing is provided.

12 Claims, 7 Drawing Sheets

OUTER MIRROR

CROSS REFERENCE TO RELATED APPLICATIONS

The present application claims benefit of the filing date of Japanese Patent Application No. 2008-124465 filed on May 12, 2008 which is incorporated herein by reference.

FIELD OF THE INVENTION

The present invention relates to an outer mirror attached to a side door of a vehicle or a surrounding area of the side door.

DESCRIPTION OF THE RELATED ART

As an outer mirror attached to a side face of a vehicle, a retractable outer mirror is generally used. In the retractable outer mirror, a mirror assembly is rotatable between an unfolded position at which a mirror surface of a mirror is roughly perpendicular to the side face of the vehicle and a folded position at which the mirror surface of the mirror is roughly parallel to the side face of the vehicle.

FIG. 7A is a front view of a prior art outer mirror. FIG. 7B is an enlarged sectional view of a surrounding area of an opening of FIG. 7A. As shown in FIG. 7A, the prior art outer mirror 100 includes a mirror base 101 extending laterally from the side face of a vehicle body, a shaft body 105 provided uprightly on the mirror base 101, and a mirror assembly 102 rotatably mounted on the mirror base 101 around the shaft body 105 used as a rotational axis.

The mirror assembly 102 includes a housing 103 having an opening 106 toward the mirror base 101, and a mirror 104 mounted on the housing 103. The shaft body 105 is inserted into the opening 106 of the housing 103 to be a rotational axis of the mirror assembly 102.

By the way, in the prior art outer mirror 100, while the vehicle is moving, a problem arises that wind flows into a gap K between the mirror base 101 and the mirror assembly 102 (the housing 103) to generate a wind noise (a so-called "whistle noise") which discomforts passengers. That is, as shown in FIG. 7B, while the vehicle is moving, the wind flows from the gap K into the housing 103 through the opening 106. At this time, when a distance Kw between an edge of the opening 106 and the shaft body 105 is large relative to a height Kh of the gap K, the wind flows into the housing 103 easily, and a velocity and a pressure of the wind vary largely. As a result, the whistle noise is generated.

Accordingly, JP 2000-318522 A discloses an outer mirror including a circular convex portion formed on a surface opposed to a mirror base of a housing; and a concave portion formed on an upper surface of the mirror base and fitted into the convex portion. The circular convex portion covers an outer circumference of a shaft body and occlude a gap between the mirror base and a mirror assembly. This permits the whistle noise to be prevented while the vehicle is moving.

On the other hand, JP 11-180216 A discloses an outer mirror in which a rubber frame member is fitted around a base of a shaft body. A lower end of the frame member touches a mirror base, and an upper end touches a lower end of a housing. Therefore, a gap between the mirror base and a mirror assembly can be occluded. Also, the outer mirror has a locating hole formed on an upper surface of the mirror base, and a locating ball formed on a lower surface of the housing. By such a structure, when the mirror assembly rotates, the locating ball comes out of the locating hole to lift the mirror assembly. Therefore, the frame member does not prevent the mirror assembly from rotating.

Also, in the prior art, the whistle noise is prevented by filling the gap between the mirror base and the mirror assembly with a packing material such as a felt, sealing material, or etc.

However, in the structure according to JP 2000-318522 A, the circular convex portion is provided on the surface opposed to the mirror base of the housing, and the concave portion fitted into this convex portion is provided on the mirror base. Therefore, a problem arises that the manufacturing operation becomes complicated. Also, because friction may be generated by sliding between the convex portion and the concave portion associated with the rotation of the mirror assembly, a problem arises that the rotation of the mirror assembly is prevented.

On the other hand, in the structure according to JP 11-180216 A, in order to avoid friction between the frame member and the mirror assembly when the mirror assembly rotates, the locating hole and the locating ball are provided. Therefore, a problem arises that the manufacturing operation becomes complicated.

Also, the whistle noise is prevented by filling the gap between the mirror base and the mirror assembly with a packing material such as a felt, sealing material, or etc. However, a problem arises that the rotation of the mirror assembly is prevented.

Therefore, an object of the present invention is to provide an outer mirror which prevents the whistle noise generated by the gap between the mirror base and the housing without the rotation of the mirror assembly being prevented. Another object of the present invention is to provide an outer mirror which is easy to manufacture.

SUMMARY OF THE INVENTION

In order to achieve the above objects, the present invention provides an outer mirror which includes a mirror base provided on a vehicle body; a shaft portion fixed to the mirror base; a mirror assembly rotatably mounted on the mirror base around the shaft portion used as a rotational axis; a windshield member to occlude a gap between the mirror base and the mirror assembly, in which the shaft portion includes a mounting seat attached to the mirror base; a shaft body provided uprightly on the mounting seat, the mirror assembly includes a housing having an opening toward the mirror base and the shaft body is inserted into the opening; and a mirror attached to the housing, and the windshield member is provided around the shaft body exposed at the gap between the mirror base and the mirror assembly, and touches the mounting seat by its own weight.

By such a structure, the windshield member covers the shaft body to occlude the gap between the mirror base and the mirror assembly (housing). As a result, the whistle noise is prevented. Also, because the windshield member is merely placed on the mounting seat of the shaft portion by its own weight, the windshield member does not prevent the mirror assembly from rotating. Also, because the windshield member is merely placed on the mirror base by its own weight, it is easy to manufacture.

Also, the present invention provides an outer mirror which includes a mirror base provided on a vehicle body; a shaft portion fixed to the mirror base; a mirror assembly rotatably mounted on the mirror base around the shaft portion used as a rotational axis; and a windshield member to occlude a gap between the mirror base and the mirror assembly, in which the mirror assembly includes a housing having an opening toward the mirror base and the shaft body is inserted into the opening; and a mirror attached to the housing, the windshield member is provided around the shaft body exposed at the gap between the mirror base and the mirror assembly, and touches the mirror base by its own weight.

By such a structure, the windshield member covers the shaft body to occlude the gap between the mirror base and the mirror assembly (housing). As a result, the whistle noise is prevented. Also, because the windshield member is merely placed on the mirror base by its own weight, the windshield member does not prevent the mirror assembly from rotating. Also, because the windshield member is merely placed on the mirror base by its own weight, it is easy to manufacture.

Also, it is desirable to provide an outwardly projecting locking portion on an outer circumference surface of the windshield member to lock the windshield member when the windshield member is fitted into the opening of the housing.

By such a structure, assembling work of the outer mirror becomes easy in outer mirror manufacture because the windshield member is locked when the windshield member is fitted into the opening formed on the housing.

Also, it is desirable to provide a flat portion on an upper surface of the mirror base (or the mounting seat) so that a lower end of the windshield member touches the flat portion along the entire circumference of the lower end. By such a structure, the gap between the mirror base and the mirror assembly is surely occluded.

BRIEF DESCRIPTION OF THE DRAWINGS

The objects and features of the present invention will become more readily apparent from the following detailed description taken in conjunction with the accompanying drawings in which.

DETAILED DESCRIPTION OF THE INVENTION

Figure 1:
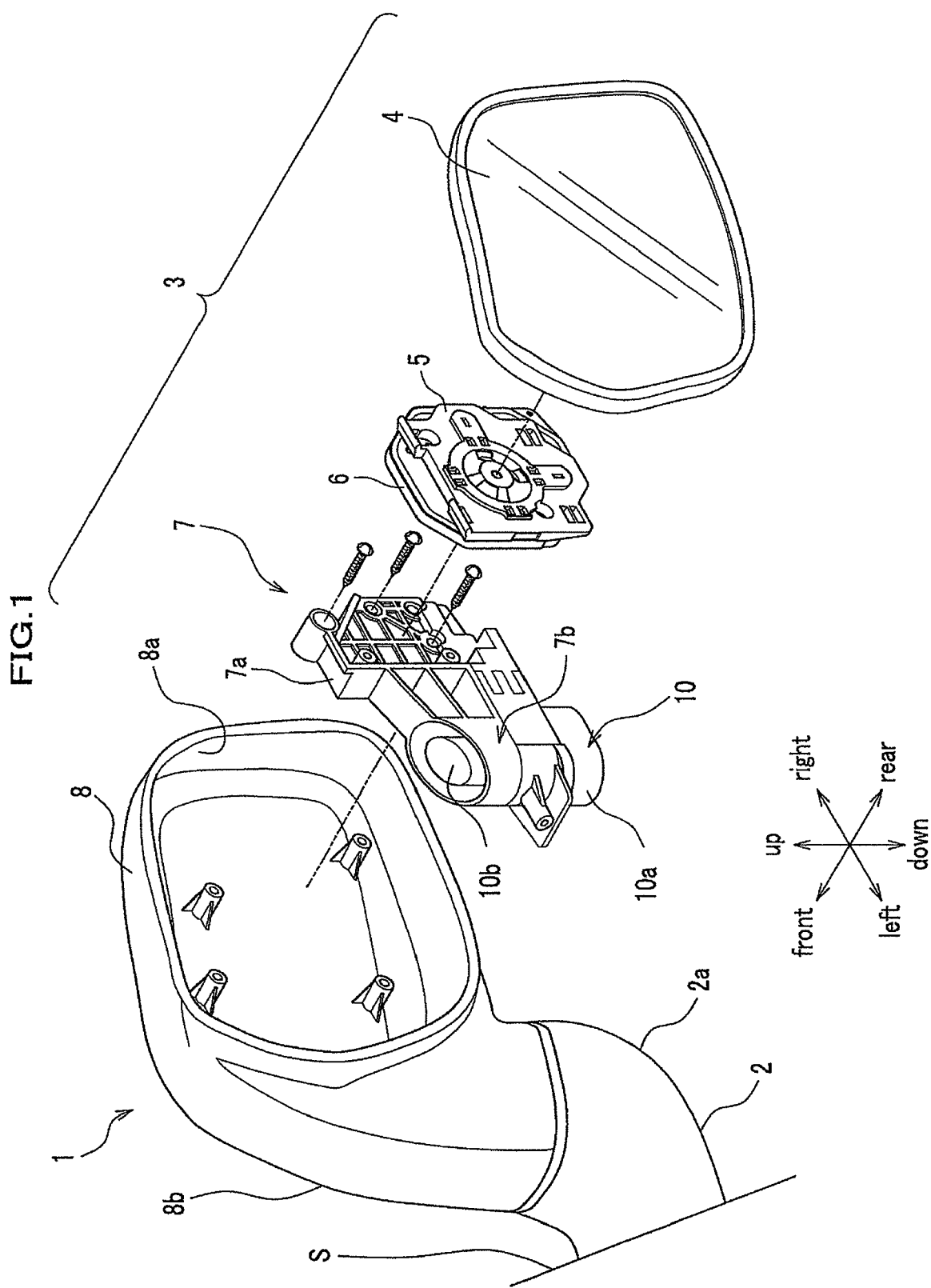
FIG. 1 is an exploded perspective view of an outer mirror according to a first embodiment.

Embodiments of the present invention will be explained below in detail with reference to the accompanying drawings. The terms describing orientations, such as front, rear, right, left, up and down, are used with reference to the outer mirror mounted on the vehicle body. FIG. 1 is an exploded perspective view of an outer mirror according to a first embodiment of the present invention. FIG. 2A is a sectional view of a housing and a windshield member according to the first embodiment of the present invention. FIG. 2B is a perspective view of the windshield member according to the first embodiment of the present invention. FIG. 3 is an enlarged sectional view of the windshield member according to the first embodiment of the present invention.

First Embodiment

As shown in FIG. 1, the outer mirror 1 according to the first embodiment is a so-called door mirror attached to a surrounding area on a side door of a vehicle body S, and includes a mirror base 2 extending laterally from a side face of the vehicle body S, a shaft body 10 fixed to the mirror base 2, and a mirror assembly 3 horizontal-rotatably mounted on the mirror base 2 around the shaft body 10 used as a rotational axis. As shown in FIG. 3, in the outer mirror 1, a windshield member 20 is provided at a gap K between the mirror base 2 and the mirror assembly 3.

The mirror base 2 supports the mirror assembly 3. As shown in FIGS. 1 and 3, the mirror base 2 is formed to project in the upward oblique direction from the side face of the vehicle body S. In this embodiment, the mirror base 2 includes a tube portion 2a projecting from the vehicle body S in the upward oblique direction like an arc, and an upper plate portion 2b to occlude a front edge of the tube portion 2a. An electric cord C is inserted into a hollow portion of the tube portion 2a to supply electric power to the mirror assembly 3. The upper plate portion 2b is provided with a flat portion 2d having a flat upper surface, and an insertion hole 2c into which the electric cord C is inserted.

As shown in FIG. 1, the mirror assembly 3 includes a mirror 4, a mirror holder 5 to hold the mirror 4, an actuator portion 6 to tilt the mirror holder 5, a frame 7 to hold the actuator portion 6 and the shaft body 10, and a housing 8 to accommodate the mirror 4, the mirror holder 5, the actuator portion 6, and the frame 7. The actuator portion 6 adjusts the tilt of the mirror 4 in vertical and horizontal directions via the mirror holder 5. The frame 7 includes a flat plate 7a to hold the actuator portion 6, and a cylindrical portion 7b into which a described below shaft body 10 is inserted.

Figure 2:
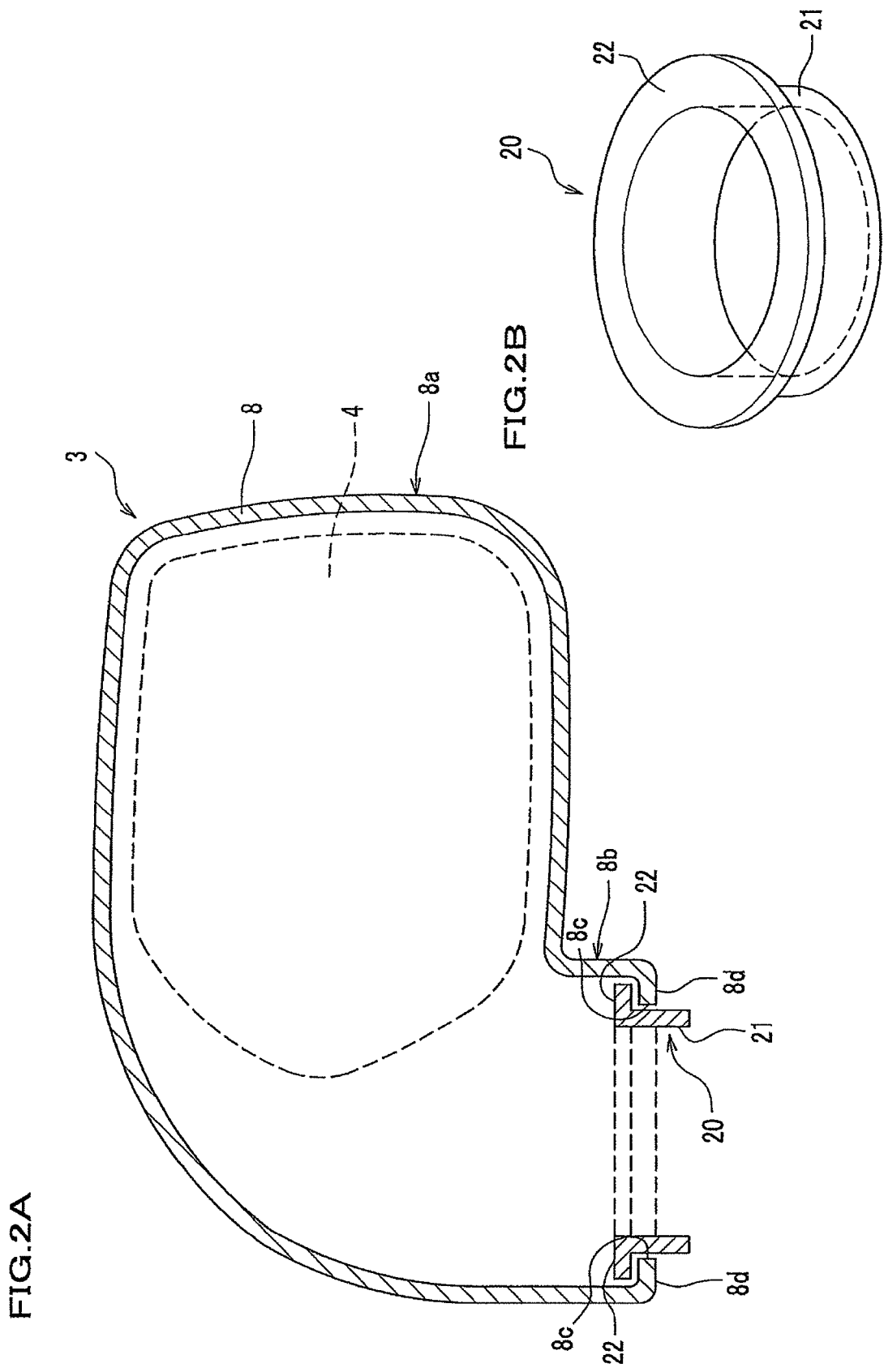
FIG. 2A is a sectional view of a housing and a windshield member according to the first embodiment.
FIG. 2B is a perspective view of the windshield member according to the first embodiment.
Figure 3:
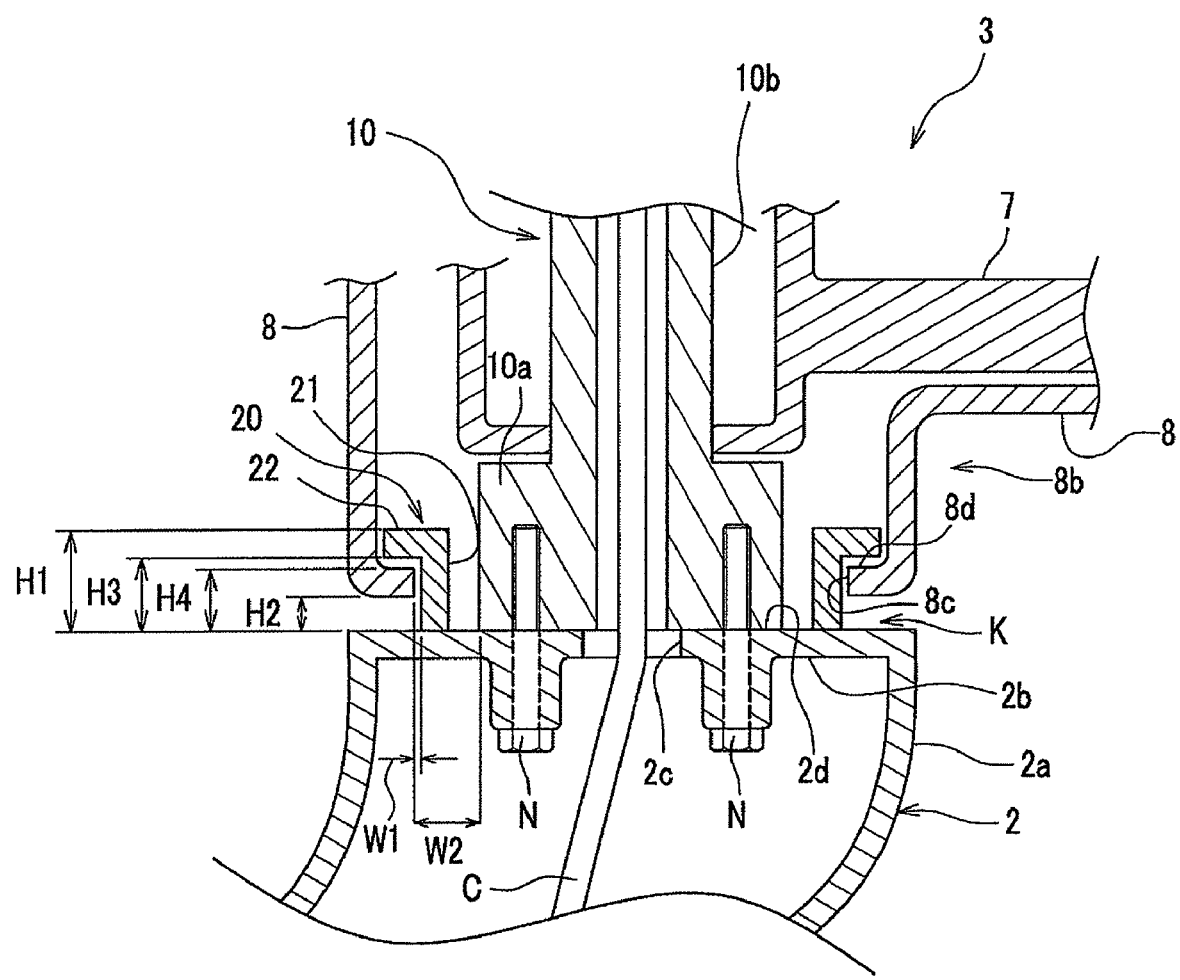
FIG. 3 is an enlarged sectional view of the windshield member according to the first embodiment.

As shown in FIGS. 1 and 2, the housing 8 includes a body portion 8a to accommodate the mirror 4 and the frame 7, etc. and a connecting portion 8b continuously formed from the body portion 8a and opposed to the mirror base 2. The connecting portion 8b is formed to communicate in the vertical direction, and the cylindrical portion 7b of the frame 7 is located therein. At an lower end of the connecting portion 8b, a ring-shaped flange 8d is formed to project in the inward direction, and an opening 8c is formed toward the mirror base 2. In this embodiment, the opening 8c is made in an approximately circular form in accordance with a shape of a described below base 10a of the shaft body 10. Also, an outer diameter of the connecting portion 8b and an outer diameter of the upper plate portion 2b of the mirror base 2 are approximately the same.

As shown in FIGS. 1 and 3, the shaft body 10 includes the base 10a fixed to the mirror base 2, and an cylindrical axial portion 10b provided uprightly on the base 10a. The base 10a is fixed to the upper plate portion 2b of the mirror base 2 via screws N. The axial portion 10b is a rotational axis of the mirror assembly 3, and is inserted into the cylindrical portion 7b of the frame 7. The electric cord C is inserted into the axial portion 10b to supply electric power. A clutch mechanism (not shown) is configured within the shaft body 10 so that the mirror assembly 3 can rotate by a predetermined rotational angle. The shaft body 10 is attached to the frame 7 so that the base 10*a* projects from the opening 8*c* slightly. By the above structure, when the base 10*a* of the shaft body 10 is fixed to the upper plate portion 2*b* of the mirror base 2, a gap K is formed between the upper plate portion 2*b* and the connecting portion 8*b*.

As shown in FIGS. 2 and 3, the windshield member 20 is an annular member to occlude the gap K, and is placed on the upper plate portion 2*b* of the mirror base 2. The windshield member 20 includes a tube portion 21 to communicate in the vertical direction, and a locking portion 22 which projects outwardly from an upper end of the tube portion 21. The tube portion 21 is configured to be cylindrical, and its lower end is configured to be flat. An inner diameter of the tube portion 21 is greater than an outer diameter of the base 10*a* of the shaft body 10. Also, an outer diameter of the tube portion 21 is less than a diameter of the opening 8*c*.

The locking portion 22 is configured to be ring-shaped to project outwardly from an outer circumference surface of the tube portion 21. An outer diameter of the locking portion 22 (a distance from a center of the windshield member 20 to an outer edge of the locking portion 22) is greater than the diameter of the opening 8*c*. By the above structure, prior to attaching the mirror assembly 3 to the mirror base 2, the locking portion 22 is locked to the flange 8*d* when the windshield member 20 is fitted into the opening 8*c*.

As shown in FIG. 3, a height H1 of the tube portion 21 is at least greater than a height H2 of the gap K. By the above structure, the windshield member 20 covers an outer circumference of the shaft body 10, and occlude the gap K in the vertical direction. In this embodiment, the height H1 of the tube portion 21 is set so that the lower end of the tube portion 21 touches the mirror base 2 when the shaft body 10 is fixed to the mirror base 2. That is, in this embodiment, a height H3, which means a distance from the flat portion 2*d* of the mirror base 2 (the upper surface of the mirror base 2) to the lower surface of the locking portion 22, is greater than a height H4, which means a distance from the flat portion 2*d* of the mirror base 2 to the upper surface of the flange 8*d*. By the above structure, in a condition with the shaft body 10 is fixed to the mirror base 2, the lower end of the tube portion 21 touches the mirror base 2, and the locking portion 22 of the windshield member 20 is spaced apart from the flange 8*d* of the housing 8.

Also, the windshield member 20 is placed at a minute distance W1 from the opening 8*c*. That is, the distance W1, which means a distance from an outside face of the tube portion 21 to the opening 8*c*, is much less than a distance W2, which means a distance from an outside face of the base 10*a* of the shaft body 10 to the edge of the opening 8*c*. As a result, compared to the prior art, the inflow of wind into the housing 8 is prevented. That is, when the height H2 is greater than the distance W1, the inflow of the wind into the housing 8 is prevented even if the wind flows into the gap K. Also, by providing the locking portion 22, the distance from the upper surface of the flange 8*d* to the lower surface of the locking portion 22 is minimized. As a result, the inflow of the wind into the housing 8 is further prevented. By the above structure, the whistle noise is prevented because the velocity and the pressure of the wind do not vary largely.

Also, because the lower end of the tube portion 21 touches the flat portion 2*d* of the mirror base 2 along the entire circumference of the lower end, the gap K is surely occluded. In this embodiment, although the windshield member 20 is made of resin, it may be made of other material.

In addition, in this embodiment, although the locking portion 22 is provided on the windshield member 20, the locking portion 22 does not always have to be provided. Also, in this embodiment, although the windshield member 20 is configured to be cylindrical, the cross-section of the windshield member 20 may be polygonal, or elliptical, etc. Also, the windshield member 20 does not always have to be annular.

Next, with reference to FIGS. 1-3, a method for assembling the outer mirror 1 according to this embodiment will be explained.

First, as shown in FIG. 2, the windshield member 20 is fitted into the opening 8*c* of the housing 8 from above. Because the outer diameter of the locking portion 22 of the windshield member 20 is formed to be greater than the diameter of the opening 8*c*, the windshield member 20 is locked to the opening 8*c* (flange 8*d*) when the windshield member 20 is fitted into the opening 8*c*.

Next, as shown in FIG. 1, the frame 7 provided with the shaft body 10, the actuator portion 6, the mirror holder 5, and the mirror 4 are provided within the housing 8 to assemble the mirror assembly 3.

Next, as shown in FIG. 3, the electric cord C is inserted into the insertion hole 2*c* formed on the mirror base 2, and the base 10*a* of the shaft body 10 is fixed to the upper plate portion 2*b* of the mirror base 2 via the screws N. In this way, when the mirror assembly 3 is provided on the mirror base 2, the windshield member 20 is placed on the mirror base 2 by its own weight. That is, the windshield member 20 is fixed to neither the mirror base 2 nor the housing 8.

In the outer mirror 1 according to the embodiment described above, because the windshield member 20 occludes the gap K between the mirror base 2 and the mirror assembly 3 (housing 8), the whistle noise is prevented.

Also, because the windshield member 20 is merely placed on the mirror base 2 by its own weight and is fixed to neither the mirror base 2 nor the housing 8, the windshield member 20 does not prevent the mirror assembly 3 from rotating.

Also, because the lower end of the tube portion 21 of the windshield member 20 according to this embodiment touches the upper plate portion 2*b* (flat portion 2*d*) of the mirror base 2 along the entire circumference of the lower end, the gap K is surely occluded.

Also, the windshield member 20 according to this embodiment is provided with the locking portion 22, the windshield member 20 is locked by fitting it into the opening 8*c* of the housing 8. By the above structure, the mirror assembly 3 and the windshield member 20 are assembled easily.

Next, a second embodiment of the present invention will be explained. In addition, in the explanation of the second embodiment, a duplicate explanation will be omitted.

Second Embodiment

Figures 4A, 4B:
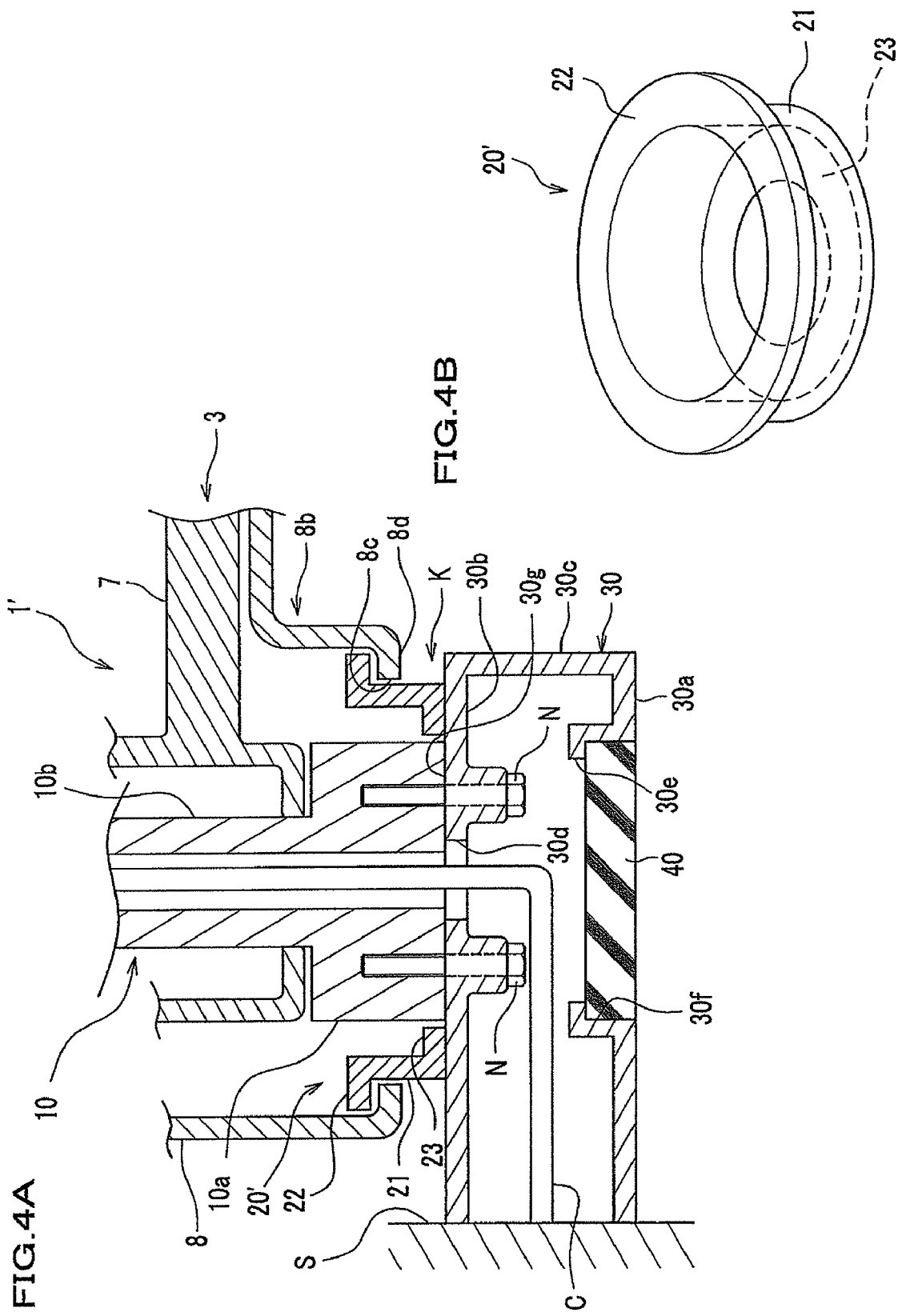
FIG. 4A is an enlarged sectional view of a windshield member according to a second embodiment.
FIG. 4B is a perspective view of the windshield member according to the second embodiment.

FIG. 4A is an enlarged sectional view of a windshield member according to the second embodiment. FIG. 4B is a perspective view of the windshield member according to the second embodiment.

As shown in FIG. 4, an outer mirror 1' according to the second embodiment differs from the outer mirror 1 according to the first embodiment in that a mirror base 30 is provided with a cover 40, and that a windshield member 20' is provided.

The mirror base 30 is formed to extend laterally from a side face of a vehicle body S, and supports the mirror assembly 3 from below. The mirror base 30 shows a tabular appearance, and includes a lower plate portion 30*a* extending from the vehicle body S, an upper plate portion 30*b* likewise extending from the vehicle body S, and a side plate portion 30*c* to connect the lower plate portion 30*a* and the upper plate portion 30*b*.

The inside of the mirror base 30 is formed to be hollow, and the electric cord C is provided through an insertion hole 30d formed on the upper plate portion 30b. On the lower plate portion 30a, a concave portion 30f is formed to locate the described below cover 40 therein, and a through hole 30e is formed to communicate in the vertical direction. An upper surface of the upper plate portion 30b is provided with a flat portion 30g.

The cover 40 is located in the concave portion 30f to occlude the through hole 30e. In this embodiment, although the cover 40 is made of tabular synthetic resin, it may be made of other material.

As shown in FIG. 4B, in the windshield member 20', an extending portion 23 extends from an inner edge of a lower end of the tube portion 21. The extending portion 23 is configured to be approximately ring-shaped, and an inner diameter of the extending portion 23 is greater than an outer diameter of the base 10a of the shaft body 10.

By the outer mirror 1' according to the second embodiment, the following effects are achieved in addition to the effects achieved by the outer mirror 1 according to the first embodiment.

Because the outer mirror 1' is provided with the through hole 30e, the mirror assembly 3 is fixed to the mirror base 2 using the screws N via the through hole 30e. By the above structure, the manufacturing operation of the outer mirror 1' can be carried out effectively. Also, after the mirror assembly 3 is fixed to the mirror base 2, the lower surface of the mirror base 2 is formed to be flat and smooth by locating the cover 40 in the concave portion 30f.

Also, because the windshield member 20' is provided with the extending portion 23, the windshield member 20' can be located stably.

Next, a third embodiment of the present invention will be explained. In addition, in the explanation of the third embodiment, a duplicate explanation will be omitted.

Third Embodiment

Figure 5A:
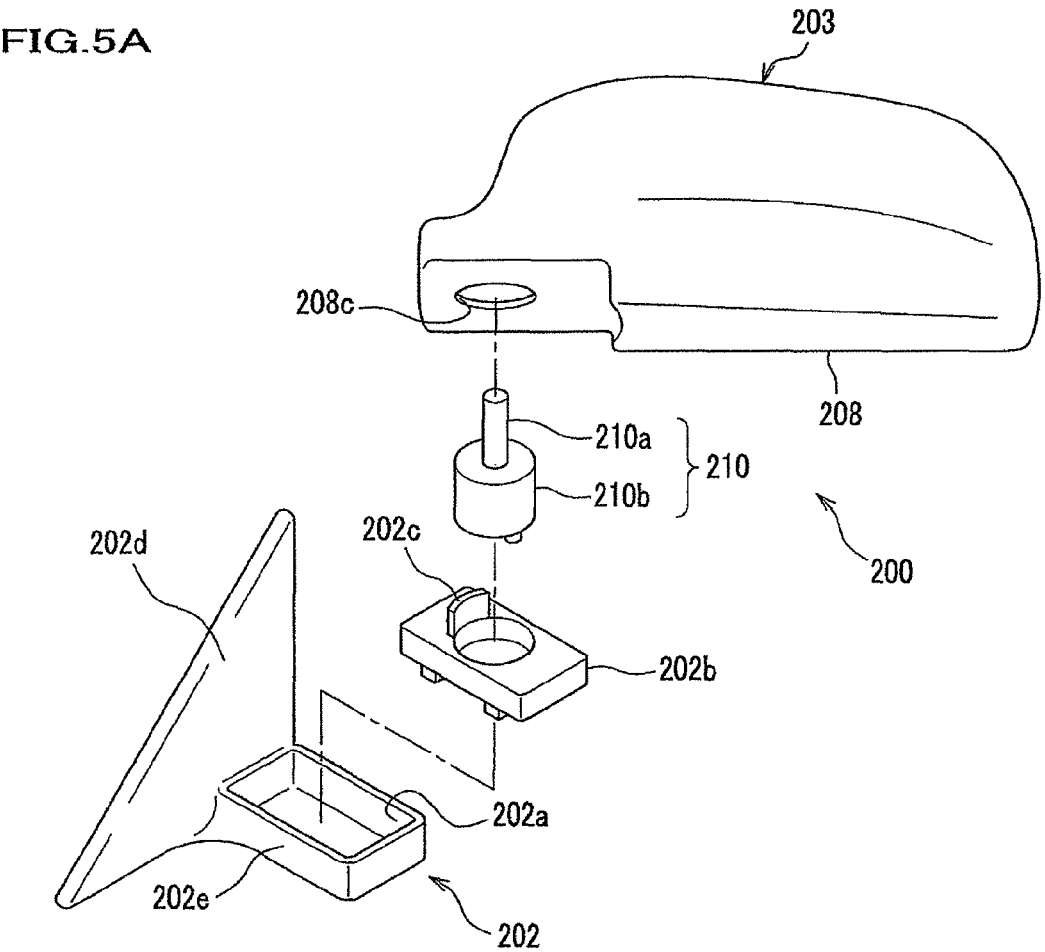
FIG. 5A is an exploded perspective view of an outer mirror according to a third embodiment.
Figure 5B:
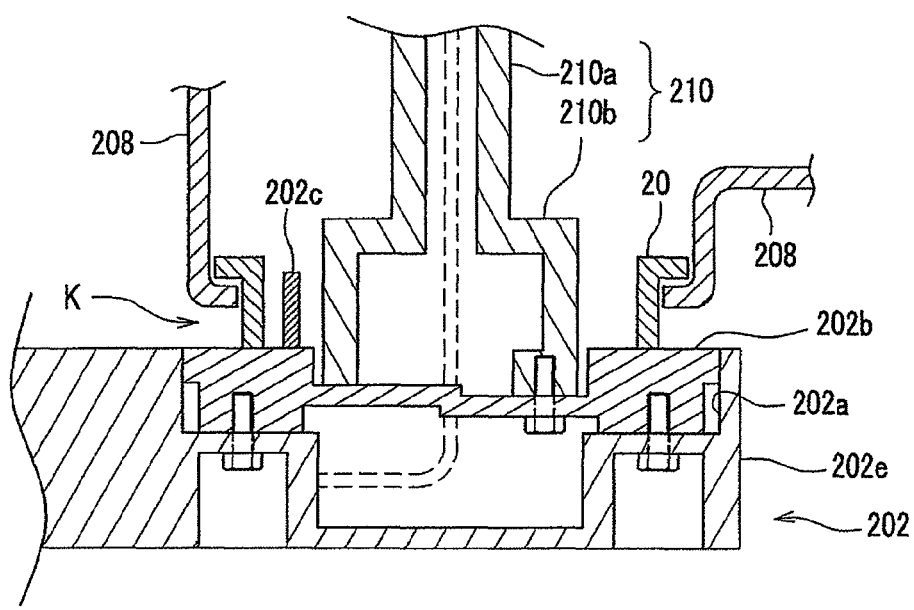
FIG. 5B is an enlarged sectional view of a windshield member according to the third embodiment.

FIG. 5A is an exploded perspective view of an outer mirror according to the third embodiment. FIG. 5B is an enlarged sectional view of a windshield member according to the third embodiment.

As shown in FIG. 5, an outer mirror 200 according to the third embodiment differs from the outer mirror 1 according to the first embodiment in that a mirror base 202 is provided with a base plate 202b.

The outer mirror 200 according to the third embodiment includes a mirror base 202 having a base plate 202b, a shaft body 210 fixed to a mirror base 202, and a mirror assembly 203 which rotates around the shaft body 210 used as a rotational axis and which has a housing 208. In the housing 208, an opening 208c toward the mirror base 202 is formed.

The mirror base 202 is provided with a supporting portion 202e extending laterally from a mounting portion 202d attached to a vehicle body (not shown). The supporting portion 202e is provided with a concave portion 202a, the configuration of which is approximately the same as that of an outer edge of the base plate 202b.

The base plate 202b is fixed to the shaft body 210, and is fitted into the concave portion 202a of the supporting portion 202e. The base plate 202b shows an approximately tabular appearance, and is provided with an angle stopper 202c on its upper surface. The angle stopper 202c engages a frame (not shown) for holding the shaft body 210, thereby the mirror assembly 203 rotates by a predetermined angle.

As shown in FIG. 5B, in the outer mirror 200 according to the third embodiment, an upper surface of the base plate 202b is flush with an upper surface of the supporting portion 202e. The windshield member 20 is placed on the base plate 202b to occlude the gap K. In this way, when the mirror base 202 is provided with the base plate 202b, approximately the same effect as that of the first embodiment can be obtained.

Next, a fourth embodiment of the present invention will be explained. In addition, in the explanation of the fourth embodiment, a duplicate explanation will be omitted.

Fourth Embodiment

Figure 6A:
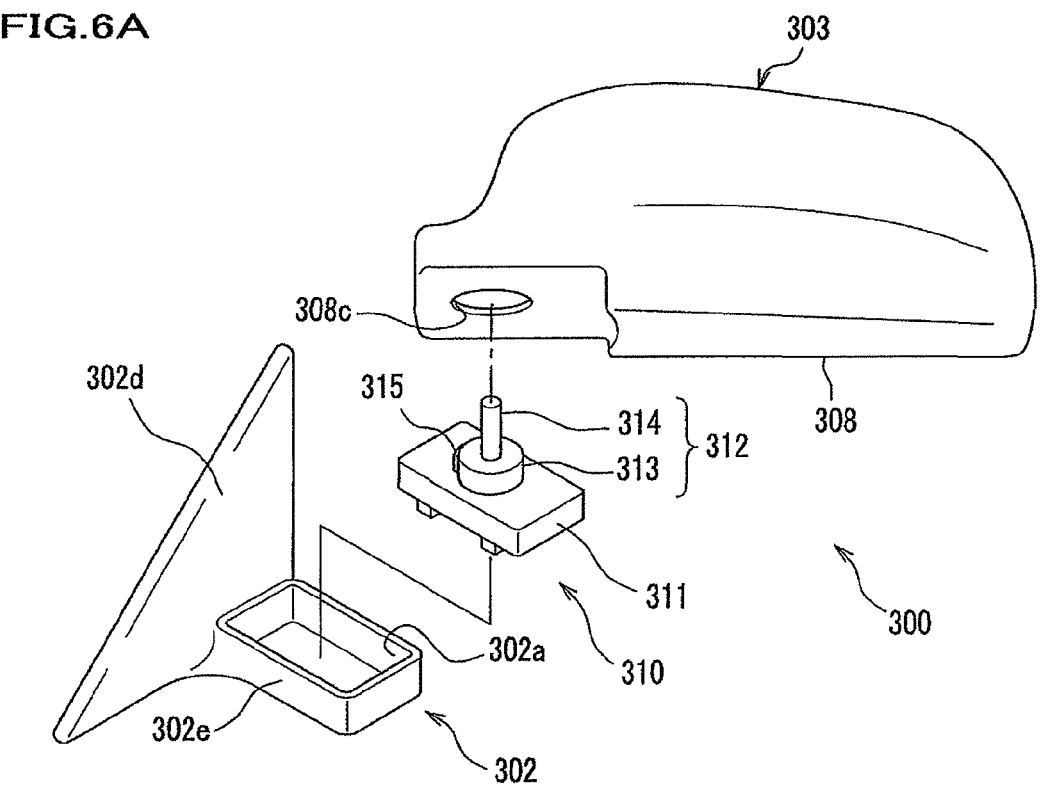
FIG. 6A is an exploded perspective view of an outer mirror according to a fourth embodiment.
Figure 6B:
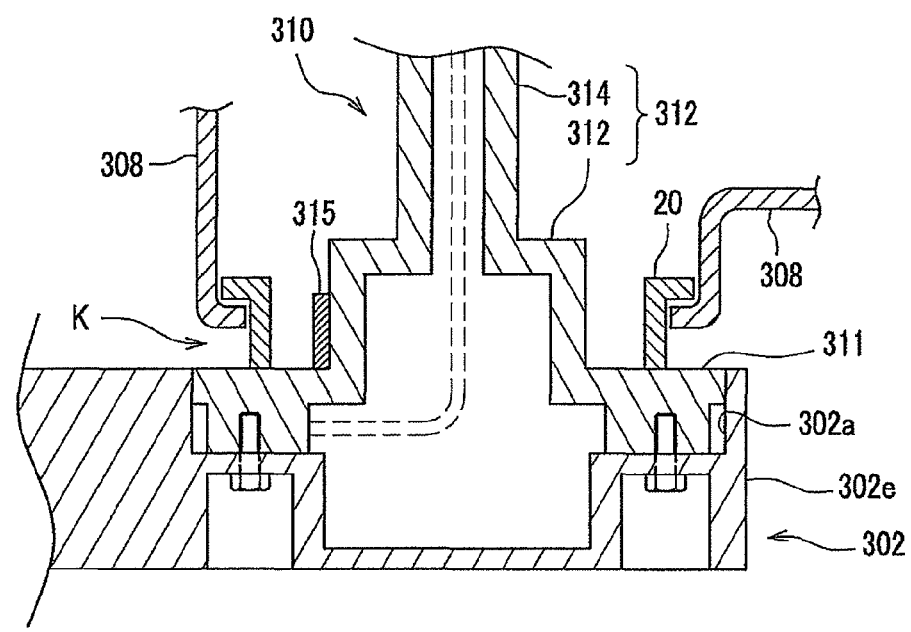
FIG. 6B is an enlarged sectional view of a windshield member according to the fourth embodiment.
Figure 7A:
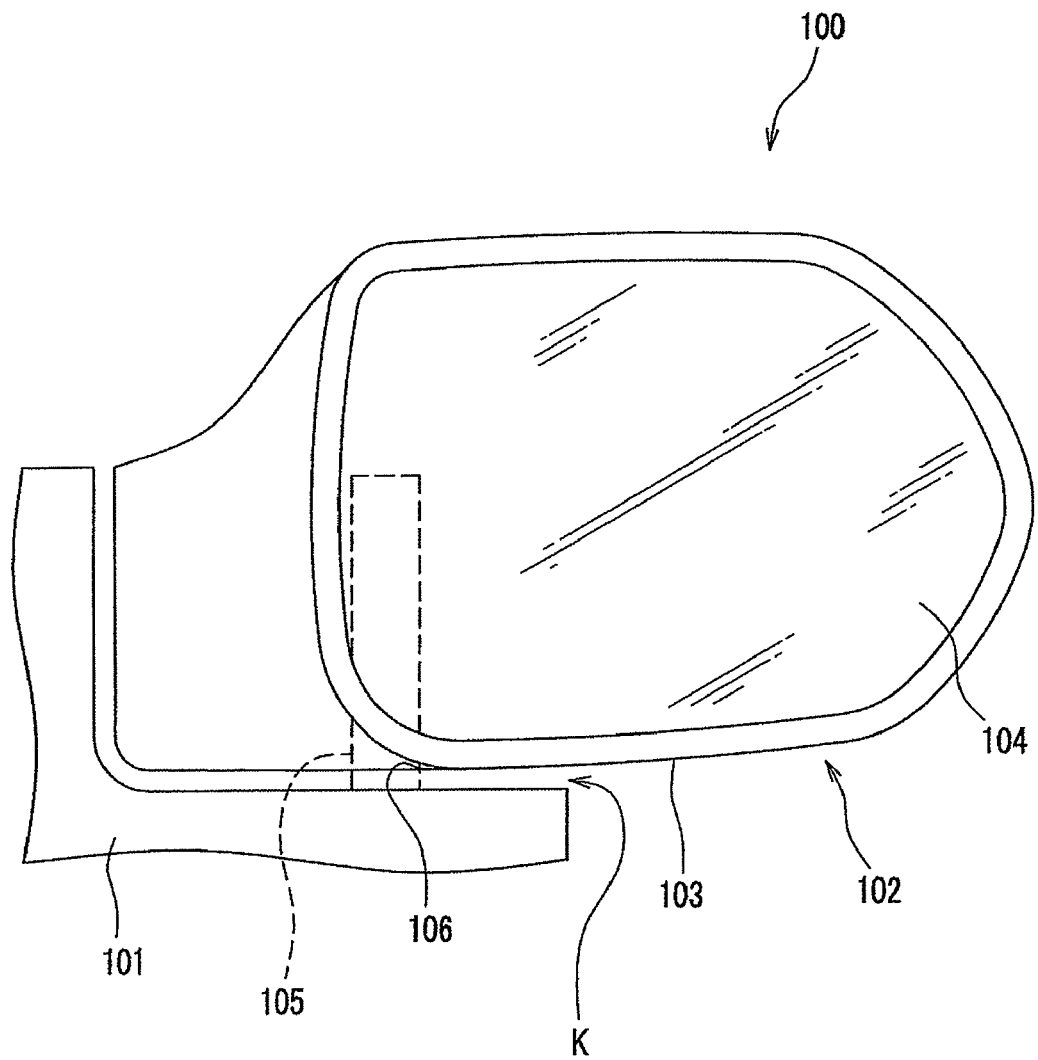
FIG. 7A is a front view of a prior art outer mirror.
Figure 7B:
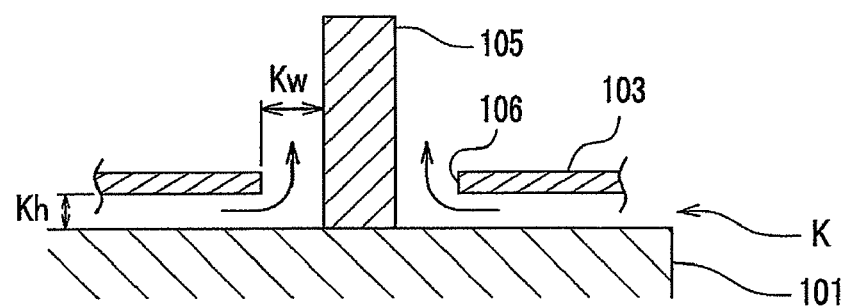
FIG. 7B is an enlarged sectional view around an opening shown in FIG. 7A.

FIG. 6A is an exploded perspective view of an outer mirror according to the fourth embodiment. FIG. 6B is an enlarged sectional view of a windshield member according to the fourth embodiment.

As shown in FIG. 6, an outer mirror 300 according to the fourth embodiment differs from the outer mirror 1 according to the first embodiment in that a shaft portion 310 includes a mounting seat 311 and a shaft body 312.

The outer mirror 300 according to the fourth embodiment includes a mirror base 302, the shaft portion 310 fixed to the mirror base 302, and a mirror assembly 303 which rotates around the shaft portion 310 used as a rotational axis and which has a housing 308.

The mirror base 302 is provided with a supporting portion 302e extending laterally from a mounting portion 302d attached to a vehicle body (not shown). The supporting portion 302e is provided with a concave portion 302a, the configuration of which is approximately the same as that of an outer edge of the mounting seat 311 of the described below shaft portion 310.

The shaft portion 310 shows a rectangular appearance in plan view, and is provided with the mounting seat 311 fitted into the concave portion 302a, and a shaft body 312 provided uprightly on the mounting seat 311. The mounting seat 311 shows a rectangular appearance in plan view, is a tabular member, and supports the shaft body 312.

The shaft body 312 includes a base 313 provided on the mounting seat 311, an axial portion 314 provided uprightly on the base 313, and an angle stopper 315 extending laterally from an outer circumference surface of the base. The angle stopper 315 engages a frame (not shown) for holding the shaft portion 310, thereby the mirror assembly 303 rotates by a predetermined angle.

As shown in FIG. 6B, in the outer mirror 300 according to the fourth embodiment, the mounting seat 311 of the shaft portion 310 is fitted into the concave portion 302a of the mirror base 302, thereby an upper surface of the mirror base 302 is flush with an upper surface of the mounting seat 311. And, the windshield member 20 is placed on the mounting seat 311 of the shaft portion 310 to occlude the gap K. In this way, when the shaft portion 310 is provided with the mounting seat 311, approximately the same effect as that of the first embodiment can be obtained by placing the windshield member 20 on the mounting seat 311. Also, because the upper surface of the mirror base 302 is flush with the upper surface of the mounting seat 311, the mounting seat 311 is prevented from being exposed at the gap K.

While preferred embodiments of the present invention have been described, it is to be understood that changes and variations may be made without departing from the spirit of the present invention.

For example, although the base 10a of the shaft body 10 has been exposed at the gap K in the above embodiments, the axial portion 10b may be exposed.

What is claimed is:

1. An outer mirror comprising:
a mirror base provided on a vehicle body;
a shaft portion fixed to the mirror base;
a mirror assembly rotatably mounted on the mirror base around the shaft portion used as a rotational axis; and
a windshield member to occlude a gap between the mirror base and the mirror assembly, wherein the shaft portion comprising:
a mounting seat attached to the mirror base; and
a shaft body provided uprightly on the mounting seat, the mirror assembly comprising:
a housing having an opening toward the mirror base and the shaft body is inserted into the opening; and
a mirror attached to the housing, and
the windshield member is provided around the shaft body exposed at the gap between the mirror base and the mirror assembly, and wherein the windshield member is positioned within an inner periphery of the opening of the housing and touches the mounting seat by its own weight.

2. An outer mirror comprising:
a mirror base provided to a vehicle body;
a shaft body fixed to the mirror base;
a mirror assembly rotatably mounted on the mirror base around the shaft body used as a rotational axis; and
a windshield member to occlude a gap between the mirror base and the mirror assembly, wherein
the mirror assembly comprising:
a housing having an opening toward the mirror base and the shaft body is inserted into the opening; and
a mirror attached to the housing, and
the windshield member is provided around the shaft body exposed at the gap between the mirror base and the mirror assembly, and wherein the windshield member is positioned within an inner periphery of the opening of the housing and touches the mirror base by its own weight.

3. The outer mirror according to claim 1, wherein an outwardly projecting locking portion is provided on an outer circumference surface of the windshield member to lock the windshield member when the windshield member is fitted into the opening of the housing.

4. The outer minor according to claim 2, wherein an outwardly projecting locking portion is provided on an outer circumference surface of the windshield member to lock the windshield member when the windshield member is fitted into the opening of the housing.

5. The outer minor according to claim 1, wherein a flat portion is provided on an upper surface of the mounting seat so that a lower end of the windshield member touches the flat portion along the entire circumference of the lower end.

6. The outer mirror according to claim 3, wherein a flat portion is provided on an upper surface of the mounting seat so that a lower end of the windshield member touches the flat portion along the entire circumference of the lower end.

7. The outer mirror according to claim 4, wherein a flat portion is provided on an upper surface of the minor base so that a lower end of the windshield member touches the flat portion along the entire circumference of the lower end.

8. The outer minor according to claim 2, wherein a flat portion is provided on an upper surface of the minor base so that a lower end of the windshield member touches the flat portion along the entire circumference of the lower end.

9. The outer minor according to claim 3, wherein a flat portion is provided on an upper surface of the mirror base so that a lower end of the windshield member touches the flat portion along the entire circumference of the lower end.

10. The outer mirror according to claim 4, wherein a flat portion is provided on an upper surface of the mirror base so that a lower end of the windshield member touches the flat portion along the entire circumference of the lower end.

11. The outer minor according to claim 1, wherein the windshield member is unfastened to both the mirror assembly and the mirror base.

12. The outer mirror according to claim 2, wherein the windshield member is unfastened to both the minor assembly and the mirror base.

* * * * *